United States Patent [19]

Larned

[11] 4,031,579
[45] June 28, 1977

[54] AIRCRAFT SEAT CUSHION

[75] Inventor: Thomas A. Larned, Costa Mesa, Calif.

[73] Assignee: The United States of America as represented by the Secretary of the Air Force, Washington, D.C.

[22] Filed: Dec. 19, 1975

[21] Appl. No.: 642,525

[52] U.S. Cl. .................................. 5/355; 5/361 B; 297/216; 297/453; 297/DIG. 1; 297/DIG. 5
[51] Int. Cl.² ........................................ A47C 27/00
[58] Field of Search ....... 5/345 R, 347, 355, 361 R, 5/361 B; 297/216, 453, 455, 456, DIG. 1, DIG. 5, DIG. 2

[56] References Cited

UNITED STATES PATENTS

| 2,981,317 | 4/1961 | Cartwright et al. .......... 297/DIG. 1 |
| 3,000,020 | 9/1961 | Lombard et al. ............ 297/DIG. 1 |
| 3,165,355 | 1/1965 | Hitchcock et al. ................ 5/345 X |
| 3,553,749 | 1/1971 | Mateske .......................... 5/361 BX |
| 3,833,259 | 9/1974 | Pershing ...................... 297/DIG. 1 |

Primary Examiner—James C. Mitchell
Attorney, Agent, or Firm—Joseph E. Rusz; Richard J. Killoren

[57] ABSTRACT

An aircraft crew seat cushion having a top cover of high porosity moisture absorbent material over a ventilation layer with a cushioning layer beneath the ventilation layer. The cushioning layer is secured to a shock absorbent layer with an adhesive. The back and sides of the cushion are made of a flame resistant material and together with the top form a cover for the ventilation layer, the cushioning layer and shock absorbent layer.

2 Claims, 4 Drawing Figures

AIRCRAFT SEAT CUSHION

RIGHTS OF THE GOVERNMENT

The invention described herein may be manufactured and used by or for the Government of the United States for all governmental purposes without the payment of any royalty.

BACKGROUND OF THE INVENTION

Aircraft crew seat cushions, such as used in ejection seats, must fulfill design requirements of light weight, flame resistance, minimum volume and impact absorption. Fulfilling these design requirements has previously resulted in seat cushions which are not comfortable. Specific problems with presently used cushions are pressure points under the buttocks and thighs, lack of conformance to a wide range of body sizes, no means of air circulation to remove heat and perspiration build-up between crewman and cushion. A cushion design is needed which results in the required comfort for an occupant sitting on the cushion for many hours without sacrificing the desired design requirements mentioned above.

BRIEF SUMMARY OF THE INVENTION

According to this invention, an aircraft crew seat cushion is provided with a cover layer which will absorb perspiration from the body. A ventilation path is provided to prevent build-up of body heat. The cushion has an upper layer, which provides weight distribution to prevent pressure points and circulation blockage. The upper layer is secured to a shock absorbent layer. The cover layer and sides and bottom layer of the cushion are made of a flame resistant material.

IN THE DRAWING

DETAILED DESCRIPTION OF THE INVENTION

Figure 1:
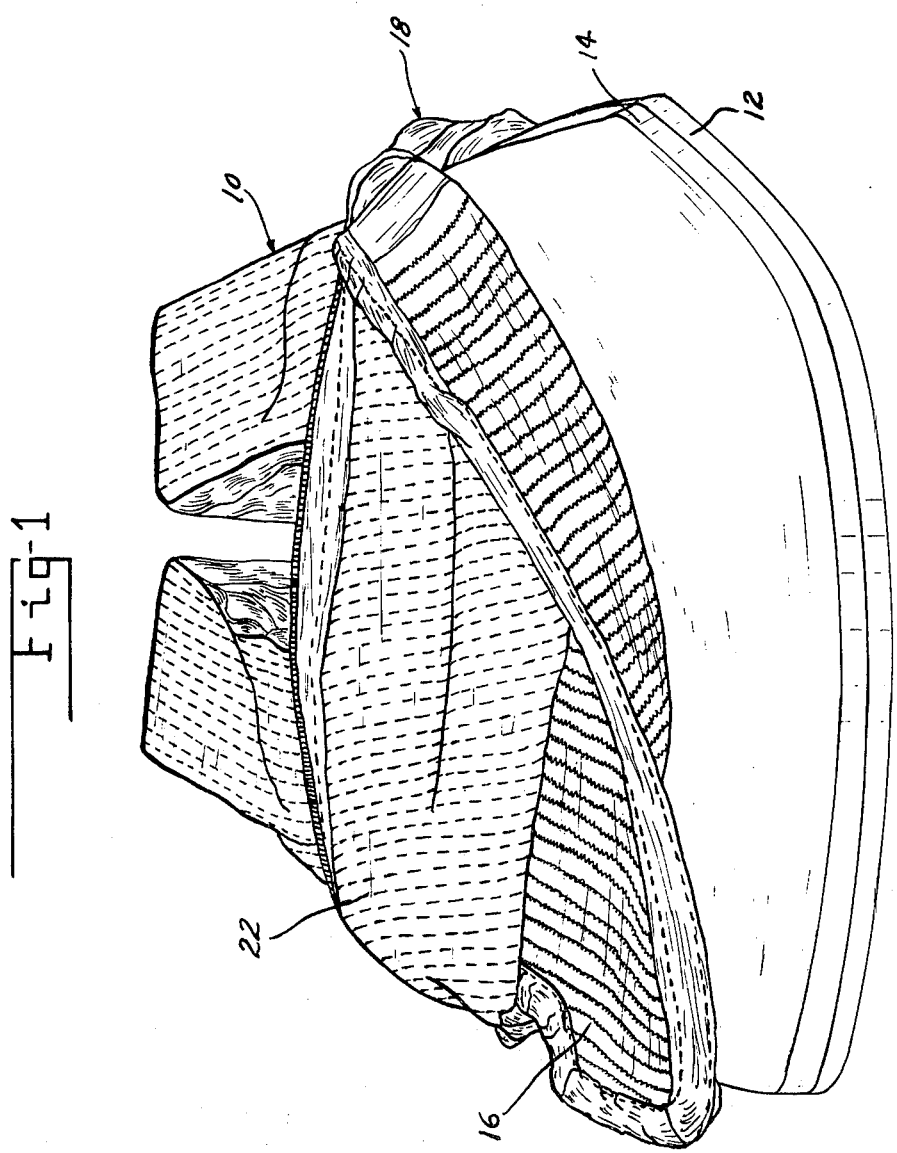
FIG. 1 is an isometric view of an aircraft crew seat cushion according to the invention.
Figure 2:
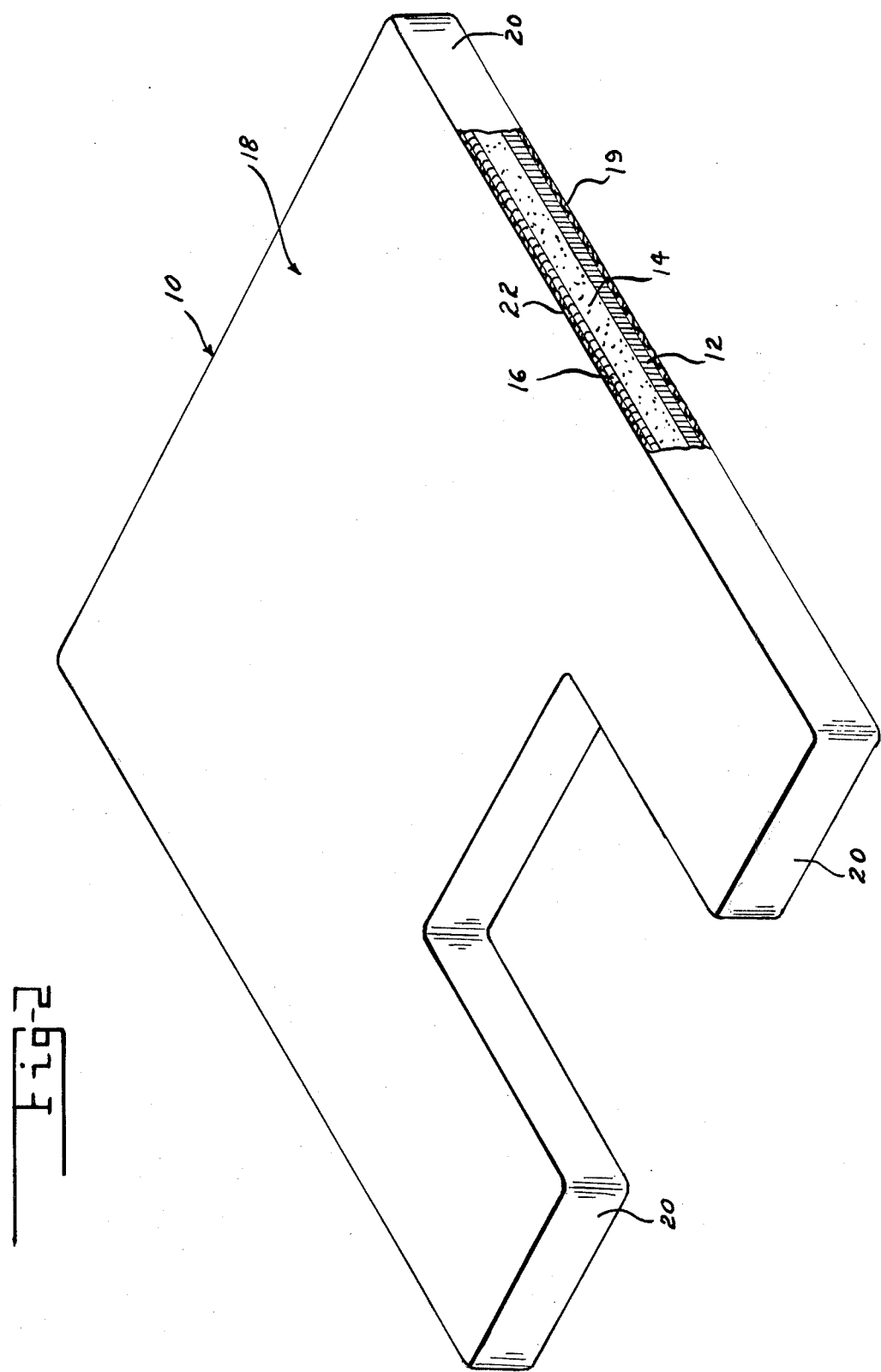
FIG. 2 is a schematic view, partially cut away, of the seat cushion of FIG. 1.
Figure 3:
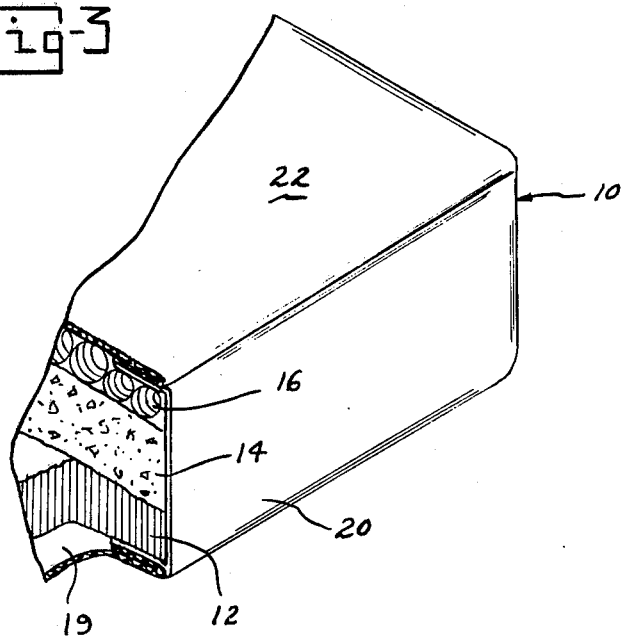
FIG. 3 is an enlarged cut away view of the seat cushion of FIG. 2.

Reference is now made to FIGS. 1–3 of the drawing which show an aircraft crew seat cushion 10 having a close cell plastic foam shock absorbant layer 12 with compression characteristics selected to prevent bottoming of the occupant's skeletal structure on the hard supporting seat structure.

An upper layer 14 is cemented to the layer 12. The layer 14 is a Visco-Elastic Foam which provides an elastic flow, which acts like a liquid, that is it is firm under impact and softens with gradual load application. The slow static compression and restoration characteristics enables the material to exactly conform to body contours without the material applying a discomforting spring-back load to the occupant's skeletal protrusions. This material thermally isolates the occupant from high or low temperature materials in surrounding structure.

A ventilation layer 16 with high porosity and low backpressure to provide air flow properties is positioned over the layer 14.

The outer cover 18 has bottom and sides 19 and 20 made of flame resistant material. The top 22, of the cover, is made of a flame resistant material with good moisture absorbant properties and high porosity to provide good air flow characteristics.

Figure 4:
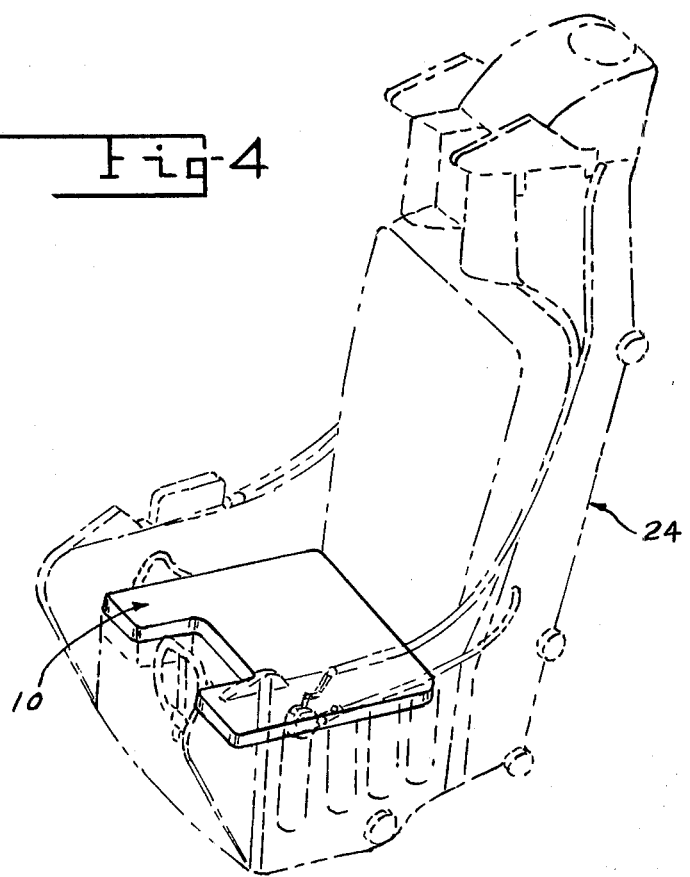
FIG. 4 is a schematic isometric view showing the seat cushion of FIGS. 1–3 as it is used in an aircraft crew seat.

The cushion 10 is used with an aircraft seat 23, as shown in FIG. 4.

Examples of materials which may be used to provide the desired characteristics for the cushion are foam, vinyl-nitrile, Ensolite Type M for the layer 12. This material can be purchased from Uniroyal Corporation. The layer 14 may be made of Temperfoam TF-47D or Temperfoam T-41 which can be purchased from Edmont-Wilson Division of Beckton-Dickinson Company. The ventilation layer 16 may be Space Fabric No. 6007-1-1-54 which can be purchased from Uniroyal Corporation. The top layer 22 of the cover may be Moisture Absorbent Upholstery-Langenthal Honeycomb fabric No. 2040 with 94% wool and 6% rayon, which can be purchased from INTERCEL Corporation. The sides and bottom of the cushion cover may be made of any flame resistant fabric, such as Nomex upholstery polyamide materials. Cements which may be used to join the layers 12 and 14 are Z-8082 or Y-8118 cement which can be purchased from the Swift Chemical Company.

Materials other than those described, which have the desired properties can be used.

There is thus provided a cushion for use in a crewman's seat in an aircraft which provides the required comfort for occupants and which are light weight, flame resistant, low volume and have high impact absorption properites.

I claim:

1. A cushion adapted for use in an aircraft seat used by crewmen, comprising: a close cell plastic layer of shock absorbent material; an elastic flow cushioning layer positioned over the shock absorbent layer; a flame resistant cover surrounding the shock absorbent layer and the cushioning layer; a ventilation layer positioned between the cushioning layer and the cover; the side of said cover adjacent the ventilation material having high porosity and being mositure absorbent.

2. The device as recited in claim 1 wherein the cushioning layer is secured to the shock absorbent layer with an adhesive.

* * * * *

UNITED STATES PATENT OFFICE
CERTIFICATE OF CORRECTION

PATENT NO. : 4,031,579
DATED : June 28, 1977
INVENTOR(S) : Thomas A. Larned

It is certified that error appears in the above-identified patent and that said Letters Patent are hereby corrected as shown below:

Column 1, line 56, after "Visco-Elastic" insert --- Plastic ---;

Column 2, line 16, cancel "23" and insert --- 24 ---.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*